United States Patent
Cheng

(10) Patent No.: US 9,524,004 B2
(45) Date of Patent: Dec. 20, 2016

(54) WEARABLE DISPLAY DEVICE

(71) Applicants: Inventec (Pudong) Technology Corporation, Shanghai (CN); INVENTEC CORPORATION, Taipei (TW)

(72) Inventor: Chia-Min Cheng, Taipei (TW)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 102 days.

(21) Appl. No.: 14/688,505

(22) Filed: Apr. 16, 2015

(65) Prior Publication Data

US 2016/0041585 A1 Feb. 11, 2016

(30) Foreign Application Priority Data

Aug. 7, 2014 (CN) .......................... 2014 1 0387629

(51) Int. Cl.
*H05K 1/00* (2006.01)
*G06F 1/16* (2006.01)

(52) U.S. Cl.
CPC ............. *G06F 1/1652* (2013.01); *G06F 1/163* (2013.01)

(58) Field of Classification Search
CPC ................................ G06F 1/163; G06F 1/1652
See application file for complete search history.

(56) References Cited

U.S. PATENT DOCUMENTS

| | | | | |
|---|---|---|---|---|
| 8,011,124 B1* | 9/2011 | Temples | ................. | G09F 3/005 40/633 |
| 9,064,391 B2* | 6/2015 | Vardi | ................. | G08B 13/1463 |
| 2003/0169207 A1* | 9/2003 | Beigel | ............. | G06K 19/07762 343/718 |
| 2013/0162526 A1* | 6/2013 | Kim | ...................... | G06F 1/1626 345/156 |
| 2013/0262298 A1* | 10/2013 | Morley | ................... | H04M 1/05 705/39 |
| 2014/0218321 A1* | 8/2014 | Lee | ....................... | G06F 1/1652 345/173 |
| 2015/0185944 A1* | 7/2015 | Magi | ..................... | G06F 1/1652 345/174 |

* cited by examiner

Primary Examiner — Yuriy Semenenko
(74) Attorney, Agent, or Firm — Maschoff Brennan

(57) ABSTRACT

A wearable display device includes a flexible display, a first engaging member and a second engaging member. The flexible display includes a folded line. The flexible display is for being bent along the folded line to remain in an extended state or a folded state. At the extended state, the flexible display has a first display screen. At the folded state, the flexible display has a second display screen. The first display screen is larger than the second display screen. The first engaging member and the second engaging member are disposed on two sides of the flexible display, respectively. The first engaging member corresponds to the second engaging member. When the flexible display is folded from the extended state to the folded state, the first engaging member is for being fastened to the second engaging member, and the flexible display is bent and surround to form a wearing space.

10 Claims, 6 Drawing Sheets

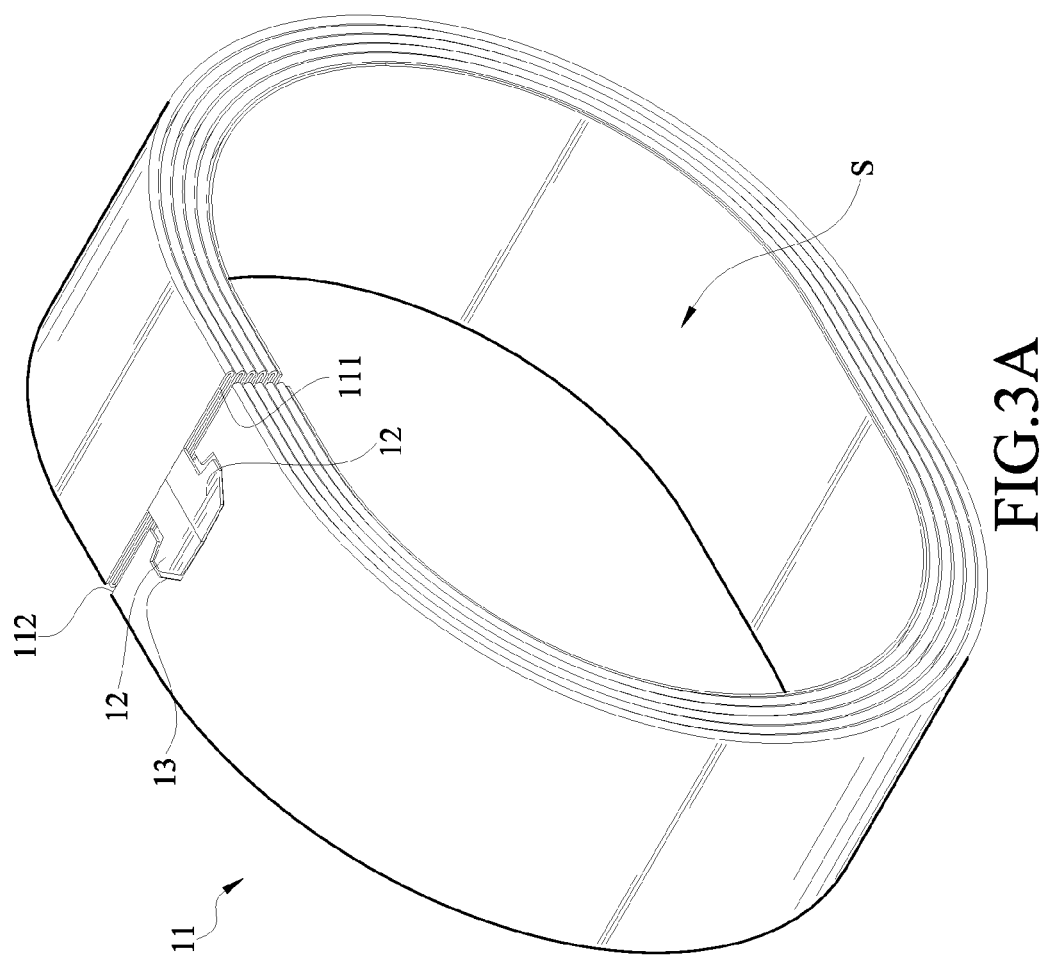

WEARABLE DISPLAY DEVICE

CROSS-REFERENCE TO RELATED APPLICATIONS

This non-provisional application claims priority under 35 U.S.C. §119(a) on Patent Application No(s). 201410387629.6 filed in China on Aug. 7, 2014, the entire contents of which are hereby incorporated by reference.

BACKGROUND OF THE INVENTION

Technical Field of the Invention

The disclosure relates to a flexible display device, and more particularly to a wearable display device with flexible display.

Description of the Related Art

With the development of technology, consumers have high demand for electronic devices with cutting-edge technologies. For example, consumers expect the electronic devices to be smaller in size and lighter in weight. Take a display panel for example, some certain materials can be selected to manufacture a housing of the display panel in order to be lighter and thinner.

However, the housing is still mainly used for protecting the display device, and therefore the housing has to be designed being firm and solid. That is, the design of the housing limits variations of the shape, structure and portability of the display device. Consequently, manufacturer tries to develop a display device which is easily portable as well as being lighter in weight.

SUMMARY OF THE INVENTION

An aspect of the disclosure provides a wearable display device comprising a flexible display, a first engaging member and a second engaging member. The flexible display comprises at least one folded line. The flexible display is for being bent along the at least one folded line to remain in an extended state or a folded state. When remaining at the extended state, the flexible display has a first display screen; when remaining at the folded state, the flexible display has a second display screen. The first display screen is larger than the second display screen. The first engaging member and the second engaging member are disposed on two sides of the flexible display opposite to each other, respectively. The first engaging member corresponds to the second engaging member. When the flexible display is folded from the extended state to the folded state, the first engaging member is for being fastened to the second engaging member, and the flexible display is bent and surround to form a wearing space.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 3A is a schematic perspective view of a wearable display device being bent to surround to form a wearing space in FIG. 1A.

DETAILED DESCRIPTION

Figure 1A:
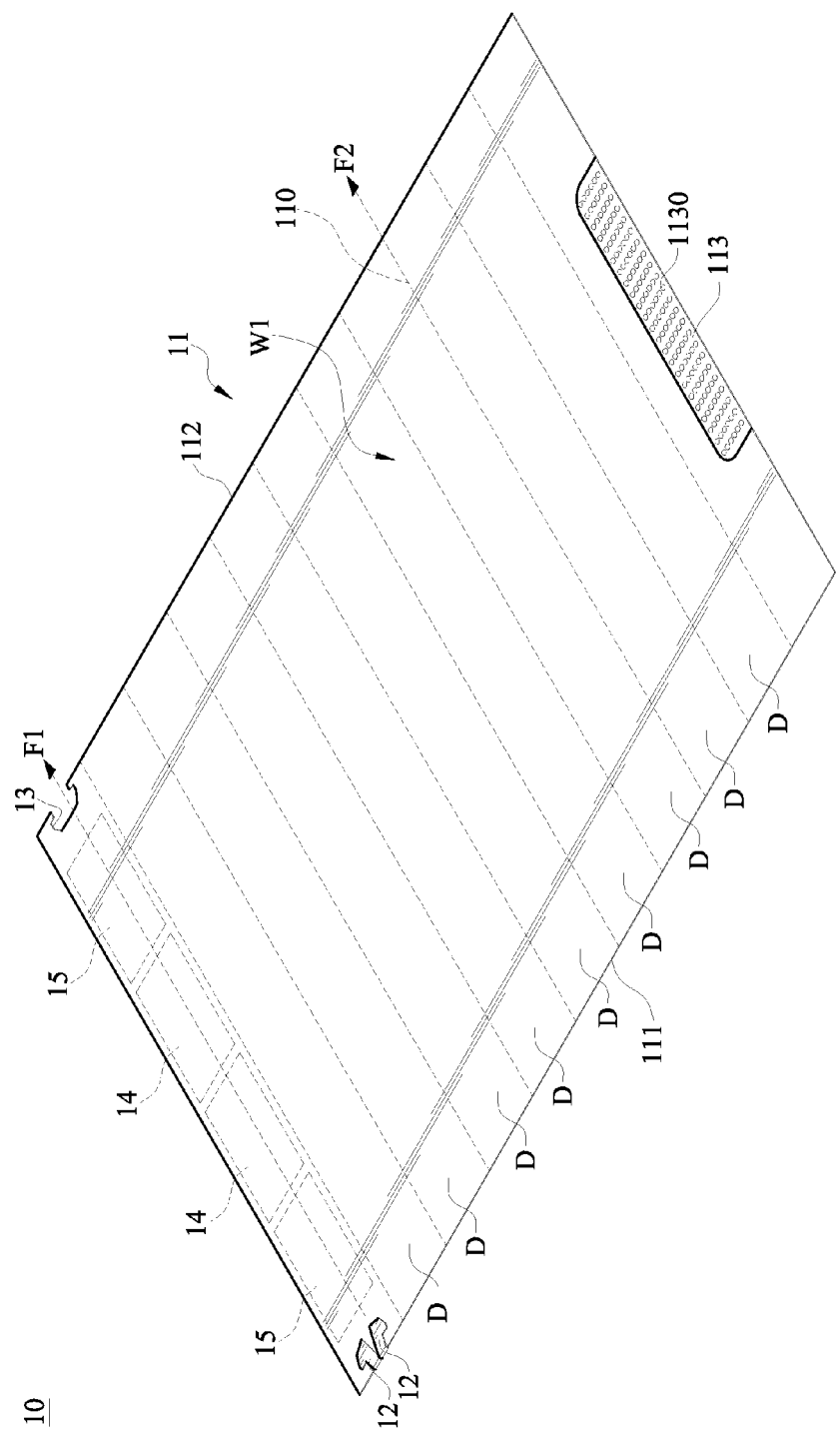
FIG. 1A is a schematic perspective view of a wearable display device when remaining at an extended state according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
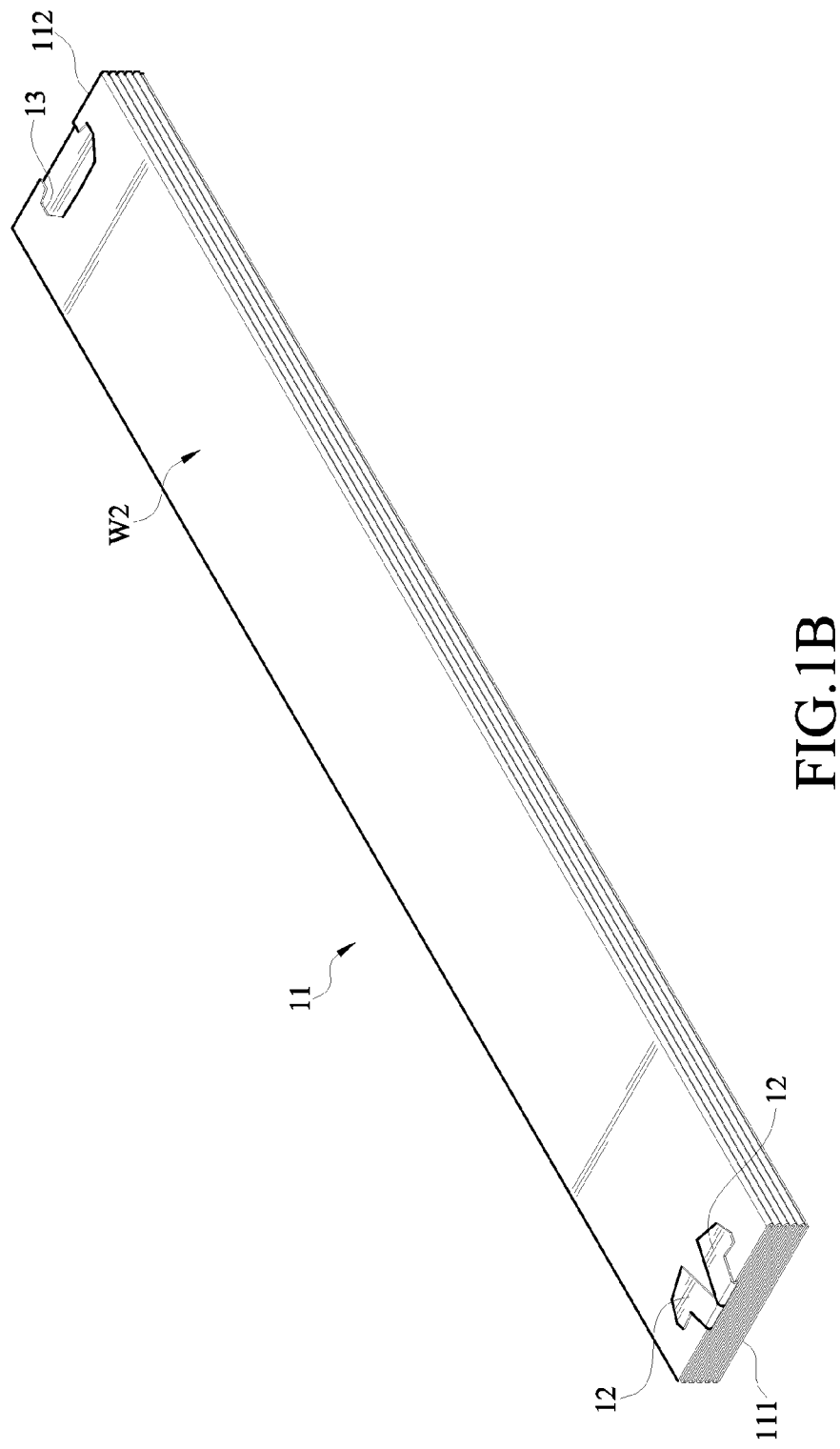
FIG. 1B is a schematic perspective view of the wearable display device in FIG. 1A when remaining at a folded state.

Please refer to FIG. 1A and FIG. 1B, FIG. 1A is a schematic perspective view of a wearable display device when being at an extended state according to an embodiment of the disclosure, and FIG. 1B is a schematic perspective view of the wearable display device in FIG. 1A when being at a folded state. The wearable display device 10 comprises a flexible display 11, a first engaging member 12 and a second engaging member 13. In this embodiment, the wearable display device 10 further comprises a control circuit 14, but the disclosure is not limited thereto.

In this embodiment, the flexible display 11 has lighter weight and smaller size. The flexible display 11 is, but not limited to, an e-paper or an e-reader. The flexible display 11 comprises at least one folded line 110. In this embodiment, the quantity of the fold lines 110 is plural, such as, but not limited to, ten.

Specifically, the flexible display 11 comprises a first side edge 111 and a second side edge 112 that are opposite to each other. In this embodiment, the fold lines 110 extend from the first side edge 111 toward the second side edge 112. Furthermore, the flexible display 11 is divided into a plurality of folded areas D by the fold lines 110.

The flexible display 11 may be bent along the fold lines 110 to remain in one of an extended state (as shown in FIG. 1A) and a folded state (as shown in FIG. 1B). The operation mechanism of the flexible display 11 between the extended state and the folded state is described as follows.

The first engaging member 12 and the second engaging member 13 are disposed on two sides of the flexible display 11 opposite to each other, respectively. In this embodiment, the first engaging member 12 is disposed on the first side edge 111, and the second engaging member 13 is disposed on the second side edge 112. Also, the first engaging member 12 and the second engaging member 13 are located on the same folded area D. In other words, a connection line Fl between the first engaging member 12 and the second engaging member 13 is substantially parallel to an extending direction F2 of the folded line 110.

Specifically, the first engaging member 12 corresponds to the second engaging member 13. In this embodiment, for example, the first engaging member 12 is a male engaging member such as a hook, and the second engaging member 13 is a female engaging member such as a slot. The hook is joined to the slot.

Figure 2A:
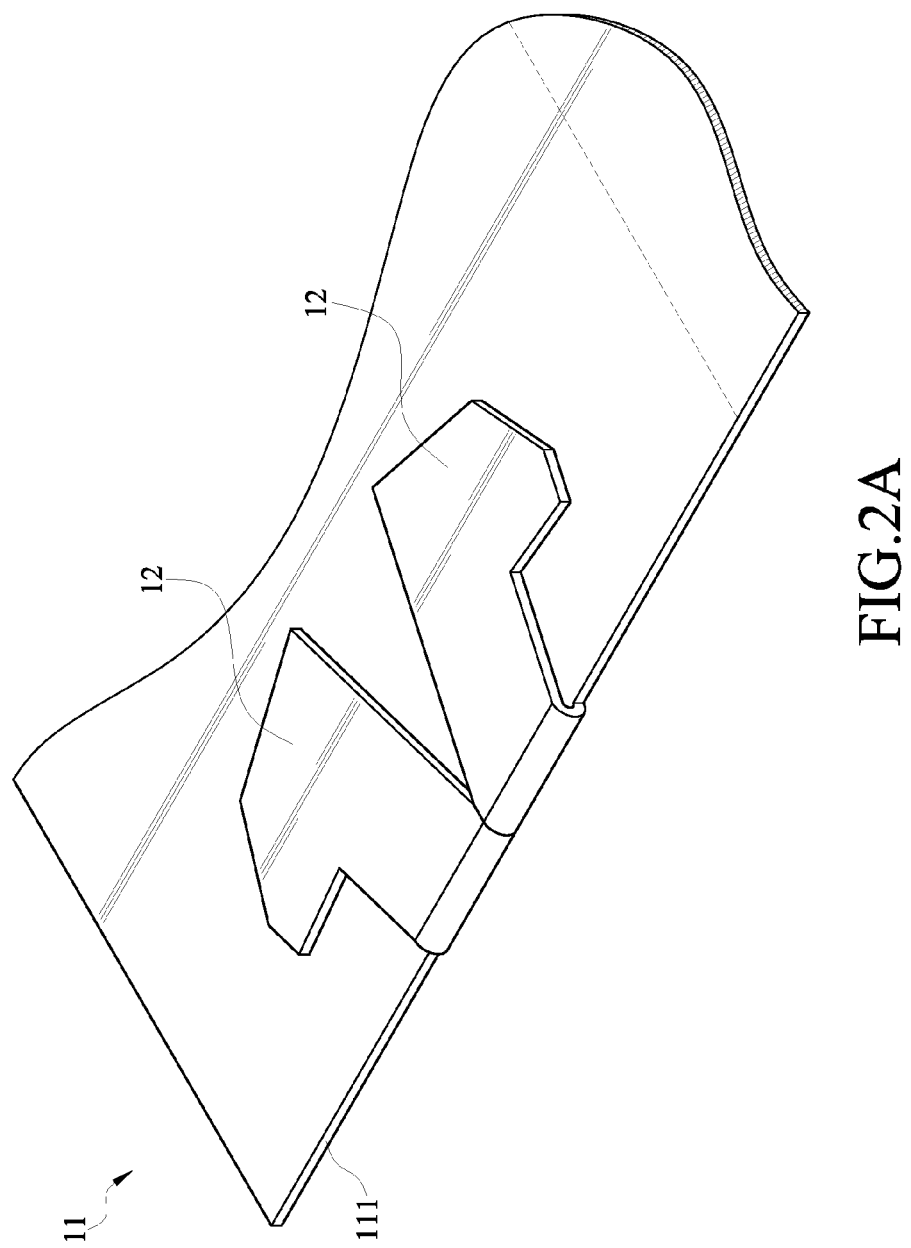
FIG. 2A is a schematic perspective view of a first engaging member in FIG. 1A when being at an accommodation position.
Figure 2B:
FIG. 2B is a schematic perspective view of the first engaging member in FIG. 1A when being at a usage position.

In this embodiment, the first engaging member 12 is movable with respect to the flexible display 11 to remain in one of an accommodation position and a usage position. Please refer to FIG. 2A and FIG. 2B. FIG. 2A is a schematic perspective view of a first engaging member in FIG. 1A when remaining at an accommodation position, and FIG. 2B is a schematic perspective view of the first engaging member in FIG. 1A when remaining at a usage position. When the first engaging member 12 remains at the accommodation position, the first engaging member 12 is embedded within the flexible display 11 such that the surface of the wearable display device 10 is leveled to be more aesthetic. When the first engaging member 12 is for moving with respect to the flexible display 11 to remain in at the usage position, the first engaging member 12 protrudes from a side edge of the flexible display 11. Thereby, the first engaging member 12 can be fastened to the second engaging member 13.

The disclosure is not limited to structures, configurations and material of the first engaging member 12. For example, the first engaging member 12 may be pivotally rotated with respect to the flexible display 11 through a pivot, so as to remain in one of the accommodation position and the usage position. In some other embodiments, the first engaging member 12 may be an elastic component with one end affixed to the flexible display 11, such that the first engaging member 12 is also movable with respect to the flexible display 11 to remain in one of an accommodation position and a usage position.

The disclosure is not limited to the first engaging member 12 being movable to the flexible display 11. In some other embodiments, the first engaging member 12 is not movable with respect to the flexible display 11. On the other hand, in other embodiment, both the first engaging member 12 and the second engaging member 13 are movable to the flexible display 11. Alternatively, the second engaging member 13 is movable with respect to the flexible display 11.

In this embodiment, the control circuit 14 is disposed on and electrically connected to the flexible display 11. Hence, the control circuit 14 may switch operation modes of the flexible screen 11 according to the usage states of the flexible display 11. The method for switching the operation modes of the flexible display 11 by the control circuit 14 is described as follows.

In this embodiment, the wearable display device 10 further comprises a power module 15 disposed on and electrically connected to the flexible display 11. Thus, the power module 15 is used for providing power for the flexible display 11.

In this embodiment, the flexible display 11 further comprises a grip 113. The grip 113 is in proximity to a side edge of the flexible display 11 (as shown in FIG. 1A). In this embodiment, the grip 113 and the power module 15 are disposed on two sides of the flexible display 11 that are opposite to each other, but the disclosure is not limited to the above-mentioned positions of the grip 113 and the power module 15. Moreover, the grip 113 comprises a plurality of beads 1130 protruding outward from the flexible display 11. Thus, the grip 113 has grater frictions for a user to hold the wearable display device 10 with better grip. In some embodiments, the plurality of beads 1130 is made of plastic. In some other embodiments, the plurality of dots 1130 is embossment.

Figure 3B:
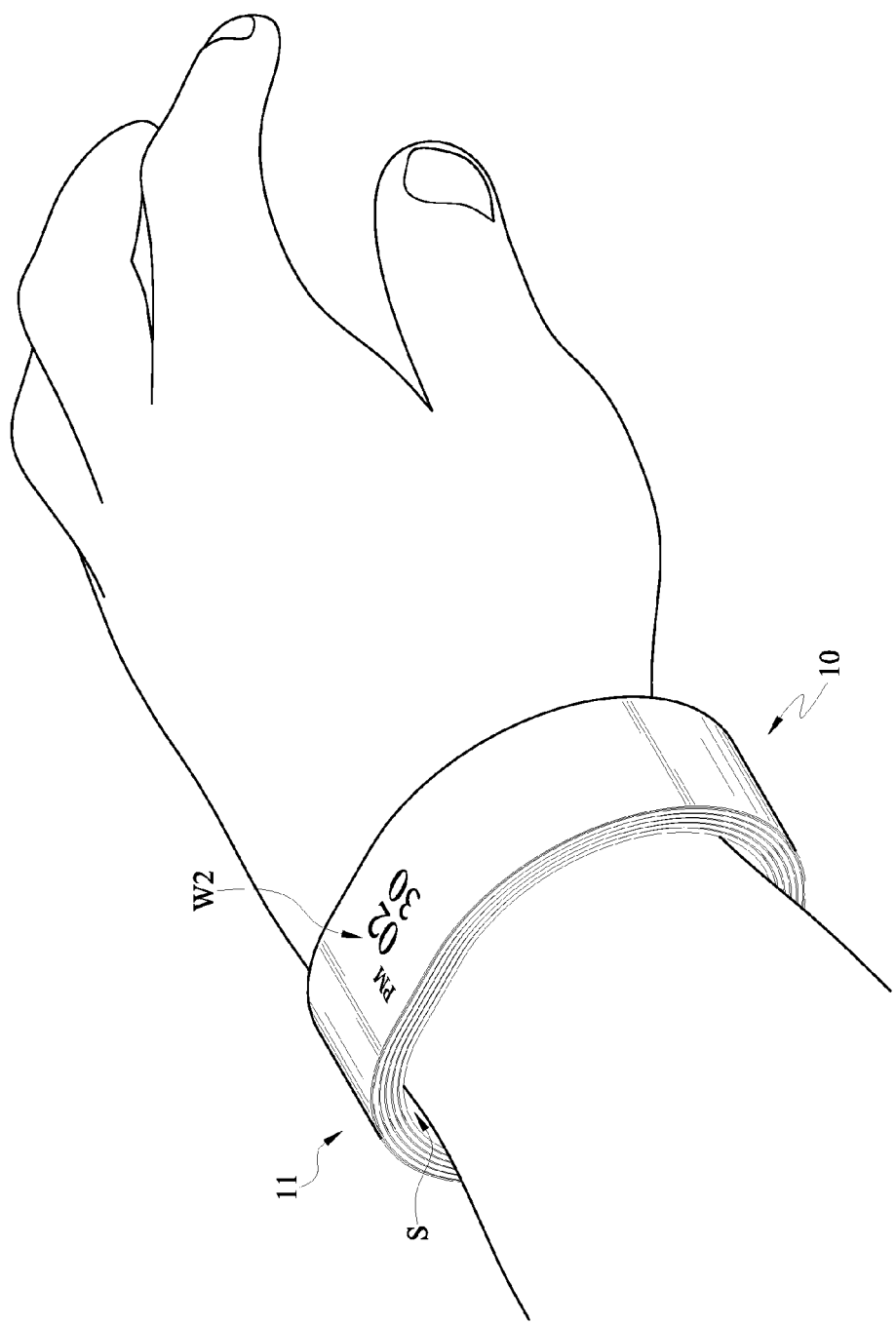
FIG. 3B is a schematic perspective view of the wearable display device worn by a user in FIG. 1A.

Please refer to FIG. 1A, FIG. 1B, FIG. 2B, FIG. 3A and FIG. 3B. FIG. 3A is a schematic perspective view of a wearable display device being bent to surround to form a wearing space in FIG. 1A. FIG. 3B is a schematic perspective view of the wearable display device worn by a user in FIG. 1A. When being engaged in some ordinary operations, such as reading, a user can expand the flexible display 11 of the wearable display device 10 to the extended state (as shown in FIG. 1A). At the extended state, the flexible display 11 has a first display screen W1. Thereby, the user can read by viewing a bigger screen (being larger than the second display screen W2)

If the user does not need to operate the wearable display device 10 and wants to store it away, the user can bend the flexible display 11 along the folded line 110 to be at the folded state (as shown in FIG. 1B). In this case, the control circuit 14 can switch the flexible display 11, such that the flexible display can have a second display screen W2, wherein the first display screen W1 is larger than the second display screen W2. Moreover, the wearable display device can provide other operation modes at the folded state different from the operations mode at the extended state. For example, the second display screen W2 can display time and/or date.

In addition, when the flexible display 11 is folded from the extended state to the folded state, a user can extract the first engaging member 12 out of the flexible display 11, and the first engaging member 12 is at the usage position (as shown in FIG. 2B). Then, the user can bend the flexible display 11 and fasten the first engaging member 12 to the second engaging member 13. Thus, the flexible display 11 at the folded state surrounds a wearing space S (as shown in FIG. 3A). A wrist of the user can extends through the wearing space S to wear the wearable display device 10 (as shown in FIG. 3B). Accordingly, it is convenient for the user to wear the wearable display device 10 through the formation of the wearing space S. Moreover, the second display screen W2 can display time, that is, the wearable display device 10 can be taken as a watch.

In this embodiment, the first engaging member 12 and the second engaging member 13 are located on the same folded area D. That is, when the flexible display 11 is folded to be at the folded state, both the first engaging member 12 and the second engaging member 13 are disposed on an outer surface of the flexible display 11 which is opposite to the other surface of the flexible display 11 surrounding (namely, encircling) the wearing space S. Hence, when the first engaging member 12 is fastened to the second engaging member 13, the combination of the first engaging member 12 and the second engaging member 13 makes the folded areas D align with each other. Thus, the wearable display device 10 can be smoothly attached to the wrist of the user such that it is comfortable for the user to wear.

In other embodiments, other components are adapted to make the folded areas D align with each other. For example, Velcro (or other combinations of hooks and loops), magnets or removable stickers are disposed between the folded areas D adjacent to each other. Hence, when the flexible display 11 is folded to be at the folded state, the folded areas D can be aligned with each other.

In the wearable display device according to the embodiments of the disclosure, since the flexible display has light weight and small size, and the flexible display can be bent to form the wearing space for a user to wear the wearable display device. Accordingly, the wearable display device is lighter for a user to wear, which solves the problem that the display panel is heavy and uneasy to carry.

Moreover, the control circuit is for switching the operation modes of the flexible display. That is, when the flexible display is folded, the flexible display can provide different kinds of operation modes to a user to operate.

What is claimed is:

1. A wearable display device, comprising:
a flexible display comprising at least one folded line, the flexible display being for being bent along the at least one folded line to remain in an extended state or a folded state, when remaining in the extended state, the flexible display has a first display screen, when remaining in the folded state, the flexible display has a second display screen, and the first display screen being larger than the second display screen; and
a first engaging member and a second engaging member disposed on two sides of the flexible display opposite to each other, respectively, and the first engaging member corresponding to the second engaging member;
wherein, when the flexible display is folded from the extended state to the folded state, the first engaging member is for being fastened to the second engaging member, and the flexible display is bent and surround to form a wearing space.

2. The wearable display device according to claim 1, further comprising a control circuit disposed on and electrically connected to the flexible display for switching the first display screen and the second display screen.

3. The wearable display device according to claim 1, wherein the flexible display comprises a first side edge and a second side edge, the first engaging member is disposed on the first side edge, the second engaging member is disposed on the second side edge, and the folded line extends from the first side edge toward the second side edge.

4. The wearable display device according to claim 1, wherein the at least one folded line divides the flexible display into a plurality of folded areas, and both the first engaging member and the second engaging member are disposed on one of the plurality of folded areas.

5. The wearable display device according to claim 1, wherein the first engaging member is movable with respect to the flexible display to remain in one of an accommodation position or a usage position, when remaining at the accommodation position, the first engaging member is embedded in the flexible display, when remaining at the usage position, the first engaging member extends outward from a side edge of the flexible display.

6. The wearable display device according to claim 1, wherein a quantity of the at least one folded line is plural.

7. The wearable display device according to claim 1, further comprising a power module disposed on the flexible display, and the power module being electrically connected to the flexible display.

8. The wearable display device according to claim 1, wherein the flexible display further comprises a grip adjacent to a side edge of the flexible display.

9. The wearable display device according to claim 8, wherein the grip comprises a plurality of beads.

10. The wearable display device according to claim 1, wherein the first engaging member is a hook, and the second engaging member is a slot.

* * * * *